United States Patent [19]

Deakin

[11] Patent Number: 4,911,353
[45] Date of Patent: Mar. 27, 1990

[54] SOLAR COLLECTOR HAVING ABSORBER PLATE FORMED BY SPRAYING MOLTEN METAL

[76] Inventor: David Deakin, 19608 Enterprise Way, Gaithersburg, Md. 20879

[21] Appl. No.: 250,722

[22] Filed: Sep. 29, 1988

Related U.S. Application Data

[63] Continuation-in-part of Ser. No. 87,201, Aug. 20, 1987, abandoned, which is a continuation-in-part of Ser. No. 846,091, Mar. 31, 1986, abandoned.

[51] Int. Cl.⁴ .................. B23K 31/02; H01L 31/04; F24J 3/02
[52] U.S. Cl. ............................ 228/183; 228/203; 228/226; 228/248; 228/261; 165/171; 126/447; 126/901; 164/46
[58] Field of Search .............. 228/183, 203, 208, 225, 228/226, 232, 248, 263.12, 165, 173.4, 261; 165/171, 168; 164/46, 900, 98; 126/446, 447, 901; 427/422

[56] References Cited

U.S. PATENT DOCUMENTS

| | | | |
|---|---|---|---|
| 2,966,423 | 12/1960 | Shichman | 164/46 |
| 3,638,299 | 2/1972 | Garner et al. | 164/46 |
| 3,990,862 | 11/1976 | Dahl et al. | 427/422 |
| 4,026,272 | 5/1977 | Bottum | 228/248 |
| 4,072,262 | 2/1978 | Godrick et al. | 228/183 |
| 4,264,641 | 4/1981 | Mahoney et al. | 427/422 |
| 4,511,600 | 4/1985 | Leas | 427/422 |
| 4,574,451 | 3/1986 | Smashey et al. | 164/46 |
| 4,579,107 | 4/1986 | Deakin | 126/442 |

Primary Examiner—Nicholas P. Godici
Assistant Examiner—Samuel M. Heinrich
Attorney, Agent, or Firm—Cushman, Darby & Cushman

[57] ABSTRACT

A method of making a solar energy collector where the absorber plate, selective surface, and protective outer skin of the collector are formed by spraying molten metal particles onto a substrate and building a coating of metal up to a desired thickness. This process allows greater flexibility in permitting a greater choice of materials and geometric shapes to be used for manufacturing the collector. The process may also be used to create the individual components of the collector, i.e., body, absorber plate, or selective surface as well as a storage tank.

20 Claims, 7 Drawing Sheets 4,911,353

SOLAR COLLECTOR HAVING ABSORBER PLATE FORMED BY SPRAYING MOLTEN METAL

CROSS-REFERENCE TO RELATED PATENT APPLICATION

This invention is a continuation-in-part of U.S. patent application Ser. No. 087,201 filed Aug. 20, 1987, which is a continuation-in-part of U.S. patent application Ser. No. 846,091 filed Mar. 31, 1986, both now abandoned.

BACKGROUND OF THE INVENTION

This invention is related to commonly owned U.S. Pat. No. 4,579,107, the application of which is co-pending herewith and incorporated herein.

The present invention relates to solar collectors and methods of producing the same, but more specifically to a low cost process for making an absorber plate, selective surface and/or the exterior member of the frame.

Solar engineers have continually struggled to compromise quality and performance for price. Eighty to ninety percent of the manufacturing cost of solar collectors is usually in materials, with the absorber plate being the most expensive component. Hence, cutting the cost of the absorber plate has been the primary goal of most manufacturers. Designs are now being marketed where the number of tubes in the absorber plate has been significantly reduced, said tubes being attached mechanically or bonded with adhesives to the absorber plate resulting in a serious loss of efficiency. U.S. Pats. to Boyd (4,074,406), Andrassy (4,089,326), Heinemann (4,245,620), Bleckmann (4,369,836) and Grahman (4,517,721) show typical absorber plates with tubes mechanically fastened or cemented into place. Mechanically fastened tubes lack adequate thermal contact with the absorber plate, decreasing heat flow, and hence, lowering efficiency. Small gaps created between the absorber tube and plate leads to the problem of corrosion which seriously impair heat flow, not to mention deterioration of the absorber plate. Adhesives are sometimes used in an attempt to overcome these problems, but are often unsuccessful. Adhesives have very limited life spans under conditions of high heat, humidity and ultraviolet light as those experienced in a solar collector. In addition, adhesives bond extremely poorly to many metals such as copper, a highly desirable metal for making absorber plates.

In order to further cut costs, manufacturers have been switching from copper to other metals, such as aluminum, as the base material for the collector absorber plate, retaining copper absorber tubes. In doing so, designers are limited to the above techniques to fasten absorber tubing to the plate, as copper cannot be soldered, brazed or welded to aluminum by traditional methods.

The present invention provides an easy solution to the problem by efficiently allowing one to permanently embed tubing of almost any type of material including copper directly within an absorber of almost any metal including aluminum, while eliminating the possibility of any galvanic corrosion, a serious drawback to many of the previously mentioned designs. Limited success in fastening copper and aluminum has been met by some manufacturers using high frequency resistance welding and/or mechanical compression, however, the processes are very labor intensive and require expensive equipment. Mechanical bonds are unreliable and high frequency bonds allow only a single tube at a time to be fixed to the absorber plate. Thus, manufacturers limit the number of tubes used, which seriously compromises efficiency.

The method of the present invention enables formation of the absorber plate around the absorber tubes regardless of their number with the same amount of effort, energy, time and equipment. This technique avoids the use of manifolds to connect respective tubes, unlike the welding and mechanical compression techniques of the prior art. A sinusoidal shape tube pattern including the bends would be very difficult or impossible to manufacture according to present state of the art fabrication techniques. In contrast, in the present invention, the absorber plate metal is laid down in a liquid state where it conforms to a substrate and the tubes can be arranged in any geometric shape. In addition, the present invention precisely vary the thickness of the absorber plate in predetermined areas, for maximum heat transfer. Moreover, manufacturers of solar absorber plates have traditionally used selective surfaces to increase the efficiency of the absorber plate, a selective surface being a coating on that surface of the collector exposed to the sun, that absorbs the maximum amount of solar radiation while emitting a minimum amount of black body radiation. The most common selective surfaces with the highest performance are black nickel and black chrome, both applied by electroplating. Although very efficient, they are very expensive processes, representing a substantial share of the cost of the absorber and hence the entire collector cost. The process involves the use of a very complicated series of cleaning, chemical, etching, and electroplating tanks, being very labor and capital intensive. The present invention significantly lowers the cost of the selective surface by applying the appropriate metals in the same manner using the same equipment as the process used to form the absorber plate. Consequently, the absorber needs only to be dipped in a single chemical conversion bath resulting in a high quality selective surface.

Additionally, absorber plates may be formed from metallic foil or sheets that already have the selective surface plated on. The present process allows one to form the absorber tubes as part of the absorber plate without overheating and damaging the existing selective surface during the manufacturing process. The advantage of this technique is that it is much more cost effective to buy large rolls or coils of foil or sheet with the selective surface already plated on it, than to make each individual absorber and electroplate the selective surface on separately. Any attempts to weld, braze or solder the tubes to the sheet or foil according to traditional methods would seriously damage the existing selective surface. Mechanical compression and high frequency welding would also be extremely damaging to the existing selective surface.

The present invention further facilitates the process used in forming the selective surface and the absorber plate to form the outer layer of metal for the collector frame and bottom of the collector. Hence, the same equipment can do almost all operations to form the collector all at the same time, streamlining production and capital equipment costs.

Traditionally solar collector manufacturers have insulated the absorber plate and/or collector with fiberglass or a foamed insulation product such as styrofoam, polyurethane or polyisocyanurate. Because of the low insulating value of fiberglass insulation, the base and walls of the collector are very thick to provide proper insulating value, and hence impractical. On the other hand, foamed products as those mentioned above cannot support the elevated operating temperatures experienced inside the collector, which is required for certification. Usually a combination of the two is used, with a layer of fiberglass separating the foam from the absorber plate. If any moisture enters the collector, which eventually happens in almost all collectors, the fiberglass becomes waterlogged, which significantly lowers the efficiency of the collector. The present invention incorporates a wider choice of materials to insulate the absorber and/or collector, in particular those that are much cheaper, can easily withstand stagnation temperatures, and if desired, form the body or structure for the collector. Hence, if the entire collector is formed from a single, unibody construction, the number and size of joints is significantly reduced or eliminated, thus greatly reducing the probability of leaks.

U.S. Pat. No. to Barrett (4,244,356) discloses a method of using a unibody frame molded out of fiberglass or ABS plastic and filled with insulation. Neither the fiberglass or ABS frame will survive the conditions experienced in the collector in the vicinity of the absorber plate. Extreme conditions of overheating, moisture and ultraviolet light degradation exist. The present invention is a vast improvement in that it can use a wider variety of materials as the structural support or body of the collector while incorporating a skin applied directly to it that can easily withstand the hostile environment inside the collector.

SUMMARY OF THE INVENTION

It is the goal of this invention to utilize a very novel process to form the majority of the solar collector, that enables one to use raw materials that are many times cheaper than those currently used, resulting in a superior collector at a fraction of the price. The process enables one to utilize metals that are in forms that are the least expensive, such as wire. The process of the invention also easily lends itself to using scrap or ingot metal for an incredible savings over sheet, extruded stock, or the metals commonly used in electroplating. In addition, the process easily lends itself to the use of raw materials that are extremely inexpensive that may be expanded for use as insulating and/or structural members of the collector. Also, means are provided, using the same equipment as that mentioned previously, to hermetically seal the exterior glazing or cover plate to the collector frame.

The present invention utilizes a single process for applying metal coatings to form the absorber plate, selective surface and/or outer skin of the body of the solar collector.

The solar collector absorber plate is formed by depositing sprayed molten metal on the surface of an appropriate substrate which includes a heat transfer means and building the coating up to the desired thickness. Heat transfer means, such as absorber tubes, may be placed on the surface of the substrate prior to spraying the metal so that the tubes are embedded in the absorber plate. The spraying process is accomplished by melting the desired metal by any means including, but not limited to, electric or gas fired, and passing the molten metal through a pressurized stream of air or gas where it is atomized or broken up into smaller particles thereby forming a fine spray of molten metal, which is subsequently deposited on the substrate. When the molten sprayed particles hit the surface of the substrate they wrap around or fit into any surface irregularities, where they cool and harden, locking to the surface. In some cases, the sprayed metal will actually fuse to the material on the surface of the substrate. The spray is usually applied in multiple thin layers so that very little heat gets transferred to the substrate. Done in this way, the coating can be built up to almost any thickness and deposited on almost any substrate. The substrate is usually prepared so as to enhance the adhesion of the coating.

Alternative means are disclosed for producing the absorber plate by a process of spraying molten metal in a fashion where the absorber plate is a distinct component separate from the substrate. In this case, the substrate is used as a mold or fixture for forming the absorber plate. The resultant absorber plate is then removed from the substrate and assembled in a collector housing as a unitary heat exchanger.

A selective surface can be created in a similar fashion. To do so, an appropriate metal is melted and sprayed onto the surface of the absorber, forming a thin layer. The coating is then brought into contact with the proper chemical bath which blackens the metal coating and results in thermal and optical properties achieved by a selective surface. The group of metals most often chosen would be, although not limited to, nickel or chrome. This process may be applied immediately following the formation of the absorber plate using the same equipment. Additionally, the absorber plate may be formed from substrates such foil or sheet that already have a selective surface on them. A coating is built up to the desired thickness on the side opposite the selective surface with the desired metal or metals as described above. Absorber tubes may also be embedded in the coating.

In another aspect of the invention, a constrictive skin is formed about the collector. In addition to forming the absorber plate and selective surface, the sprayed molten metal may be used to form a skin around the collector body and/or components, defining its extremities. The skin then is allowed to cool in such away as to shrink, putting the coated substrate into compression, increasing its strength much like tempered glass.

The invention can be used to create individual solar collector components or a unibody type collector where the absorber plate, selective surface and collector skin are simultaneously formed.

These and other objects, features and advantages of the present invention will become more apparent from the following description when taken in connection with the accompanying drawings which show, for the purposes of illustration only, plural embodiments in accordance with the present invention.

DETAILED DESCRIPTION OF THE PREFERRED EMBODIMENTS

Figure 1:
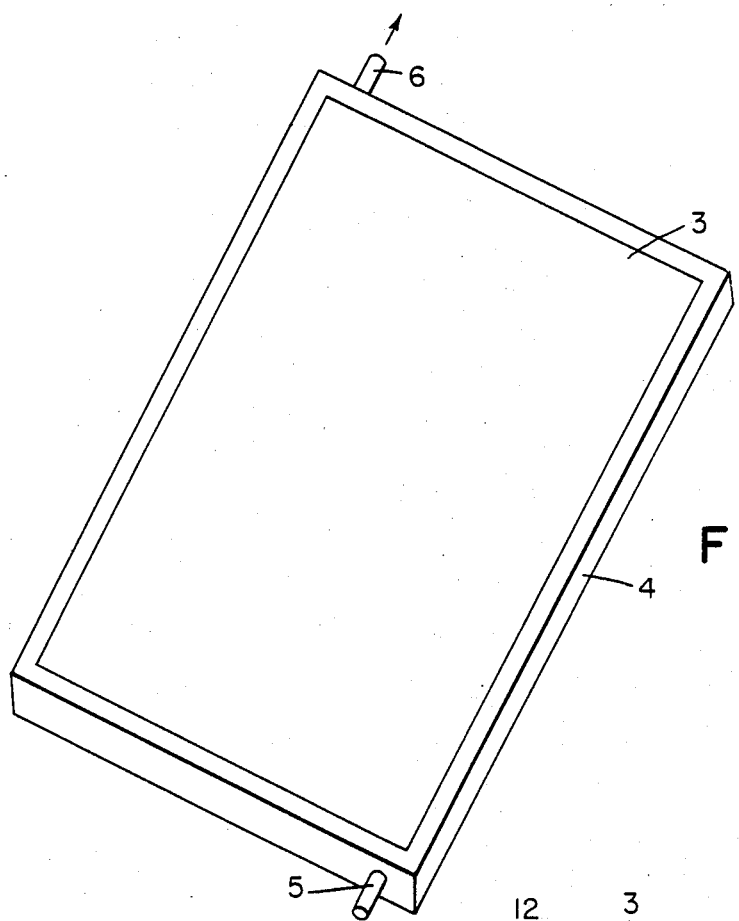
FIG. 1 is an isometric view of a basic solar collector of the flat plate type that uses sprayed metal coatings to form some of its components.
Figure 2:
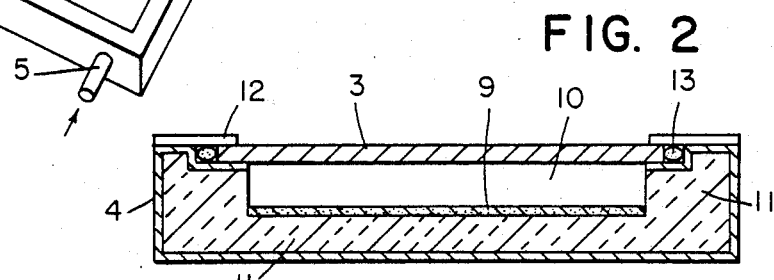
FIG. 2 is a cross-sectional view of FIG. 1, showing an absorber plate formed by spraying molten metal

Referring now to the drawings wherein like reference numerals are used to designate like parts and more particularly to FIG. 1, it is seen that a flat-plate collector comprises transparent glazing 3, collector frame 4, inlet port 5, and exit port 6. Solar radiation striking the collector passes through transparent glazing 3 and is absorbed by an absorber plate disposed beneath said glazing (FIG. 2). As the absorber plate heats up, a heat transfer medium, such as a gas or fluid, is introduced in the inlet port 5, and is brought into contact with said absorber plate 9, absorbing the available thermal energy and exiting through exit port 6 to be immediately used or put into storage. In this manner, solar energy is transferred to the working heat transfer medium. Means are provided to insulate the absorber plate for maximum efficiency, by air or gas space 10 (FIG. 2) disposed above the absorber plate, and by an insulating material 11 (FIG. 2) on the edges and underneath said absorber plate.

Some components of solar collectors are manufactured by the process of spraying molten metal. Metal of almost any kind, including most alloys, is melted by any means suitable, including, but not limited to, gas fired and electric, wherein the molten metal then passed through a stream of pressurized air or gas where it is broken up into small particles, or atomized, forming a very fine spray of molten metal. The sprayed molten metal is directed at a suitable substrate where the molten sprayed particles are deposited. When said sprayed molten metal particles hit the surface of the substrate, while still in liquid form, they wrap around or fit into any surface irregularities, subsequently cooling followed by hardening and sometimes shrinking, with the result being that the particles are permanently locked into the surface of the substrate. In some cases, depending on the temperature of the sprayed molten metal and the temperature of the substrate, said sprayed molten metal will actually fuse to the material of the substrate. In general, the adhesion of the sprayed molten metal can be improved by heating the substrate. Once the first layer of metal is achieved, subsequent layers adhere very easily. The coating is usually built up from multiple layers allowing enough time between layers for excess heat to dissipate so as not to warp or damage the substrate. Done in this manner, the coating can be built up to almost any thickness and deposited on almost any substrate.

When damage to the substrate from overheating is not a concern, the sprayed metallic absorber may be heated during or after spraying to a point where the sprayed metal particles are molten and flow together creating a more homogeneous material and consequently increasing the thermal conductivity. For best results, spraying is performed in a vacuum or inert atmosphere to eliminate the formation of oxides. Such oxides have the deleterious effect of lowering the thermal conductivity and impede the flow of the molten material.

To spray the substrate in a vacuum or inert atmosphere, the substrate is kept in a chamber which is separate from and has a lower pressure than a chamber for the molten metal reservoir. In some cases, the evacuated substrate chamber has a negative pressure lower than the molten metal reservoir which may be at atmospheric pressure. The net pressure differential causes molten metal to flow into the evacuated substrate chamber. In this case, molten metal is directed through an orifice or atomizing device to induce a spray. Sometimes, it becomes necessary to increase the pressure differential by creating a positive pressure in the molten metal reservoir in order to induce a more rapid flow or final spray. Additionally, metal may be sprayed or deposited as a powder, flake, chip or similar size and shape particles, and then fused together by melting. For economic reasons, scrap metal that has been reduced to powder, flake, chip or the like may be used to lower the cost substantially. After the powder, flake or chip has been deposited, it may be mechanically compressed before subsequent heating and melting. A binder or carrier agent may be used to hold together the deposited material which is then to be burned off during the heating and melting phase. To improve the adhesion of the melted metal to the absorber tubes, it may be desirable to first coat the tubes with a layer of sprayed metal. This may be of the same metal as the metal used to form the absorber plate. An alloy may alternatively be employed.

Alternatively, the absorber plate can be created as a separate component distinct from the remaining parts of the collector unit, and consequently attached or assembled in a collector housing. The manufacture of such absorber plate is accomplished by methods described herein, but means are additionally provided to use the substrate as a backing or fixture from which the sprayed absorber plate is peeled or lifted after the spraying operation. A separate integral and unitary part results which is distinct from the original substrate. When the choice of metal, metal thickness, geometric configuration or other parameter produces a sprayed absorber plate having insufficient structural integrity without a substrate, the substrate on which metal is sprayed remains part of the assembled structure. Generally, one attempts to choose an inexpensive substrate material. The preferred embodiment of the present invention uses, but is not limited to, foils or wire mesh as a substrate material.

By way of example, an absorber plate according to a prefer process is manufactured as follows. A thin aluminum foil having a thickness of approximately one mil is placed over a rigid structure. Aluminum or copper tubing is laid in the required pattern on the foil to provide a heat exchanger for the absorber plate. The rigid substrate may include grooves to which the foil conforms and for receiving the tubing. The substrate can be heated prior the spraying operation, if desired. After the entire assembly is laid in position, molten metal, such as aluminum, is then sprayed onto the tubing and the foil in order to build up a desired thickness of sprayed solidified molten metal across the foil which preferably embeds the tubing within. The resulting component, e.g., sprayed metal foil and tubing, is then mounted as a single unit within a collector housing. It is then mounted as a single unit within a collector housing. It is evident that other variations of this process can be practiced.

In some cases, it may be desirable to use a different alloy or metal. An example would be where a problem was experienced when heating the tube and metal of the absorber plate and the sprayed or deposited metal loosens or peals. A different alloy of the same metal with a higher melting temperature or a different metal altogether may be used. In all cases, a self-fluxing alloy or metal may be used to enhance the flow of the melted metal.

As mentioned previously, the sprayed molten metal particles adhere best to irregularities in the surface of the substrate. In order to improve adhesion, usually the substrate is prepared so as to create irregularities. This may be accomplished by roughening up the surface, usually by grit or sand blasting, such as with aluminum oxide. When grit blasting is not feasible, usually because the substrate is too soft, it may be necessary to coat the substrate with a material that will ensure good adhesion of the sprayed metal coating. This additional coating may also have to be roughened or grit blasted, particularly if said coating is smooth. Additionally, it may be desirable to add a powder or other grit-type material. Some examples of said coating would be adhesives or coatings of just about any kind, including, but not limited to, epoxy and polyester resins. The preferred embodiment uses a sodium silicate base or derivative because of its superior sealing qualities, longevity, wide temperature range, and low cost. Additionally, it may be necessary to add a powder or other grit-type material to the coating to give the surface a textured or rough finish enhancing the adhesion of the sprayed molten metal. For best results, the powder or grit should be applied to the said coating while it is still in an uncured, semi-cured, or semi-liquid state. The preferred embodiment uses, but is not limited to, aluminum oxide as the grit to improve the adhesion of the sprayed molten metal. Adhesion of the sprayed molten metal may be improved sometimes by spraying the molten metal while said underlying coating is still uncured or semi-viscous, i.e., not hard or dry.

Because the sprayed molten metal is carried by a pressurized stream of air or gas, its deposition characteristics are subject to the nature in which the stream of air or gas strikes the surface of the substrate. Inert gas may also be used as a source of pressurized gas. It is sometimes advantageous to change the geometry of the surface to be coated so that the sprayed molten metal is deposited where and in a manner that is desirable. An example where this is often applicable is where two or more objects or surfaces are to be joined or embedded with molten metal, such as, for example, to fix a round tube to a flat surface. Because it is difficult to direct the molten metal spray to the underside of the tube, it is often desirable to make a groove in the substrate to receive all or part of the tube. In some instances there may be a gap created between the edge of the groove and the edge of the tube, where the molten metal spray may be reluctant to fill in or bridge the gap. It is therefore necessary to fill the gap with a material that will ensure a smooth transition from the substrate to the tube. The preferred embodiment uses, but it not limited to, a sodium silicate base or derivative with aluminum oxide on the exposed surface.

Sometimes the metal with which one desires to spray has difficulty adhering properly. It may then be advantageous first to spray the substrate with another metal that will adhere well to said substrate thereby to provide a suitable base for the desired molten metal spray. The preferred embodiment uses zinc as a base spray. In addition, sometimes the desired metal for the sprayed metal coating is not compatible with the material in the substrate. Coatings such as, but not limited to, epoxy and polyester resins, and/or a sodium silicate base or derivative may be used as previously described. However, it may be advantageous to spray the substrate initially with a metal that is compatible with the material of the substrate, forming a suitable base for the desired sprayed metal coating. Hence, it is possible to create as many layers of as many different sprayed metals as one desires.

According to the present invention, metals can be used in their least expensive form, such as wire to create the molten metal spray. Also, different metals may be melted or mixed together in the pressurized stream of air or gases to form alloys. Very unique and exotic alloys can be formed this way.

As the substrate is coated with the molten metal spray, care should be taken to distribute the heat evenly so as not to create hot spots that could damage the substrate, or cause warpage or deformation. One can coat the substrate in very thin layers with molten metal, allowing the heat from each layer to dissipate before applying the next layer, or let some heat build up evenly on the entire substrate, and then let the sprayed metal coating cool causing it to shrink putting the substrate into compression and thus increasing its strength.

FIG. 2 illustrates a cross-sectional view of a version of FIG. 1, where the absorber plate 9 is formed by spraying molten metal onto a substrate according to the process described previously. The absorber plate 9 may be formed by spraying a substrate 11 with the desired molten metal and securing it within the collector body, or alternatively, spraying the desired molten metal directly onto the insulating substrate 11 forming the absorber plate 9 directly thereon. Absorber 9 can be formed from copper and/or aluminum. Absorber plate 9 is insulated above from air space 10, said air space may be filled with an insulating gas. Additionally, absorber plate 9 is insulated on the bottom and sides by insulating material 11. Insulating material 11 may be a cellular or foam insulation material. The preferred embodiment uses lightweight, foamed or cellular concrete or gypsum. This material is used because of good strength, a wide useful temperature range, and good insulating characteristics, while being extremely inexpensive. Other materials which may be used include foamed polyurethane, foamed polyisocyanurate, or foamed styrofoam. Solar collector housing 4 is shown which supports glazing 3 and houses the components of the collector. This member may be fabricated by existing techniques. Seal 13 is illustrated which seals transparent glazing 3 to collector frame 4 and may be constructed according to conventional practice. Clamp 12 holds the glazing securely within the collector.

Figure 3:
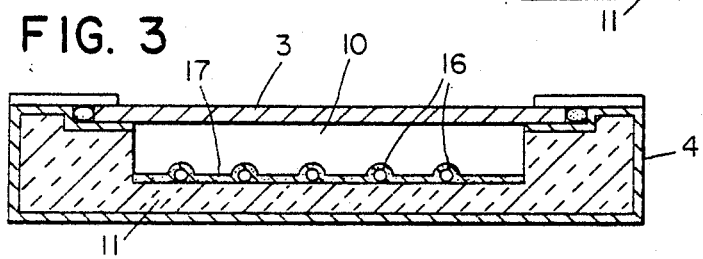
FIG. 3 is a cross-sectional view of FIG. 1, showing an absorber plate with integral heat transfer tubes embedded in it, formed by spraying molten metal.

FIG. 3 is a cross-sectional view of yet another version of FIG. 1, similar to that in FIG. 2, except that absorber tubes 16 have been added to the absorber plate 17. The absorber plate 17 is formed in the same way as absorber 9 in FIG. 2, except 5 that molten metal is sprayed over absorber tubes 16 and its substrate embedding them within absorber plate 17. The preferred embodiment uses copper tubes sprayed with aluminum. As discussed in the background of the invention, copper tubing is extremely difficult to attach to an aluminum absorber, soldering, brazing or welding according to conventional practice being just about impossible. However, this combination of metals is extremely desirable because of the corrosion resistance of the copper tubes to the heat transfer fluids, which usually have water as the major component, and because of the low cost of the aluminum for the absorber plate. The process described herein, of spraying molten metal to form the absorber plate works extremely well by embedding the copper tubing within the aluminum or attaching it thereto, with bond strengths of 8000 psi or higher easily attained. Because the copper absorber tube is wrapped in the aluminum absorber plate, the copper tubing is sealed off from environmental factors such as moisture and salt ions that might promote galvanic corrosion. In addition, no fluxes as with conventional, soldering, brazing and welding processes, are needed, fluxes usually containing high concentrations of metal salts.

Additionally, the method described herein, of spraying molten metal to form the various surfaces or components, compensates for any unequal thermal expansion or contraction. As described previously, when the sprayed metallic particles strike the surface of the substrate they tend to flatten out, or wrap themselves around or fit into any surface irregularities. The net result is that the sprayed metal particles become physically locked together in a way so that the sprayed metal coating is more elastic or flexible than standard rolled, drawn, cast or extruded metal. In this way, the sprayed metal coating can compensate for differences in thermal expansion and contraction between itself and those substrates that it is attached to, such as the absorber tubes and/or insulating members.

Figure 4:
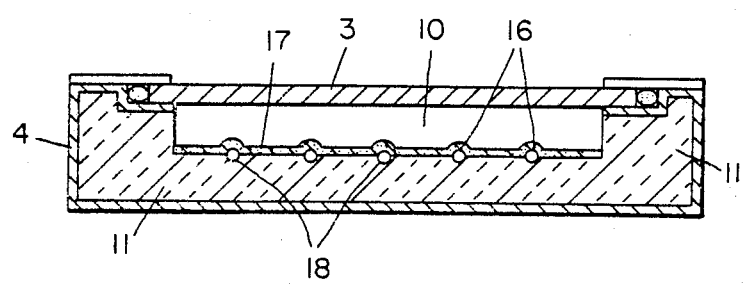
FIG. 4 is a cross-sectional view of FIG. 1, with an absorber plate having integral heat transfer tubes embedded in it.

FIG. 4 is a cross-sectional view of a variation of FIG. 1 and is very similar to FIG. 3, where the absorber tubes 16 are embedded in the absorber plate 17 by spraying molten metal 15 directly on substrate 11 and absorber tubes 16, resulting in a continuous absorber plate 17, where the absorber tubes 16 are an integral part of the absorber plate. Additionally, grooves 18 are formed in the substrate 11 to receive part of the absorber tubes 16.

Figure 5:
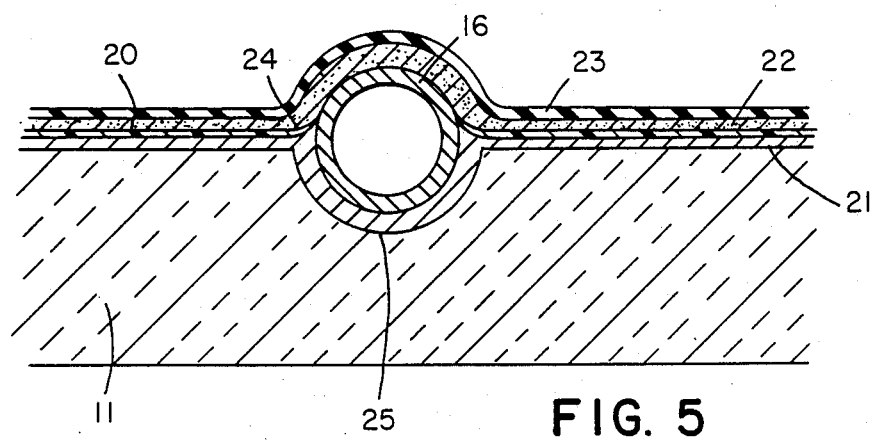
FIG. 5 is a partial expanded view of a cross-sectional view of an absorber plate and heat transfer tube.

FIG. 5 is an expanded cross-sectional view of a variation of an absorber plate such as that in FIG. 4, where the absorber plate 20 is formed directly on the insulation material 11 by spraying molten metal as described herein. Groove 25 is formed in insulating material 11 to receive all or part of absorber tubes 16. In order to improve adhesion of the sprayed metal absorber plate 20 to insulating material 11, an initial base coating 21 has been added to the surface of 11. To further improve adhesion of the sprayed metal absorber plate to insulating member 11, an additional layer or coating 22 of powder or grit has been added to the surface of base coat 21, as described previously. Base coatings 21 and 22 should bridge or close the gap at 24 created between the edge of groove 25 and absorber tube 16. This will assure that the sprayed metal absorber 20 will make a smooth transition to the absorber tube 16. This greatly enhances ease of manufacturing as described previously. The preferred embodiment uses a sodium silicate base or derivative for 21 with aluminum oxide added to the surface to form 22. One version of the preferred embodiment uses aluminum for absorber plate 20 and foamed or cellular concrete for insulation 11. The high alkalinity of the foamed or cellular concrete would normally cause corrosion on the aluminum absorber plate, however, the coatings 21 and 22 keep 20 and 11 out of contact with each other. The sodium silicate base or derivative also is absorbed beneath the surface of insulating material 11, changing its chemistry appropriately and increasing the strength of insulating material 11 when fully cured or hard. Coatings 20, 21 and 23 may also serve to keep the insulation material 11 from absorbing moisture. In addition, said coatings can also serve to keep certain insulating materials such as foamed concrete and foamed gypsum from drying out, which could cause cracking or splitting.

Additionally, FIG. 5 also shows selective surface 23, 25 which may be formed according to conventional processes or according to a novel method disclosed by the present invention. Sprayed molten metal, according to the process described herein, may be applied to absorber plate 20, forming a thin coating 23, said sprayed molten metal being chosen from a group of metals that are appropriate for use as the selective surface. Said sprayed metal coating 23 is then dipped in a chemical conversion bath, where it is chemically blackened. The result is a simple, inexpensive high quality selective surface capable of a solar radiation absorbance of .80 or better and an emittance of .3 or less in the infrared range. Solar radiation absorption of .95 and infrared emittance of .10 have been repeatedly attained. The preferred embodiment uses, but it not limited to, the metals nickel or chrome as the metal for the sprayed metal selective surface 23.

Figure 6:
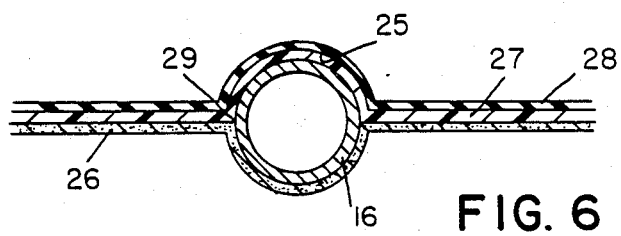
FIG. 6 is a partial expanded cross-sectional view of an absorber plate and tube formed by spraying molten metal onto a sheet or foil substrate having a selective surface.

FIG. 6 is an expanded cross-sectional view of an absorber plate formed according to the process of spraying molten metal described herein, utilizing a foil or metal sheet 27 as the substrate for sprayed metal coating 26. Foil or sheet 27 has a groove 25 formed therein to receive absorber tube 16. Sheet or foil 27 also is prepared, as previously mentioned, to improve adhesion of the sprayed molten metal layer to it. The preferred embodiment uses, but is not limited to, grit blasting as the said preparation method. Sprayed molten metal is applied, preferably in thin multiple layers, building up coating 26 onto foil 27 and absorber tube 16 to the desired thickness forming a continuous uninterrupted absorber plate. Sprayed metal coating 26 may be concentrated on the joint 29 where the substrate sheet 25 or foil 27 meets absorber tube 16, coating 29 and the area to either side of 29 on 16 and 27 with sprayed molten metal, hence attaching said absorber tube 16 to substrate sheet 27.

Also shown, in FIG. 6, is surface 28 which may be a selective or non-selective coating, specifically, to improve solar radiation absorption. In the case of a selective surface, it will also serve to inhibit infrared radiation. As described in the background of the invention, it is much less costly to buy foil or sheet in large quantities, preferably in rolls or coils, with a selective surface already plated on it than to have individual absorber plates individually plated. Manufacturers have thus far been unable to buy coated coiled or sheet stock because there is no way to solder, weld or braze absorber tubes onto the sheet or foil without damaging the selective surface because of excess heat. FIG. 6 shows that the present invention overcomes this problem by applying sprayed molten metal layer 26 in multiple thin layers and building up to the appropriate thickness, allowing any excess heat to dissipate after each layer. In this manner, the absorber tubes 16 can be efficiently attached to the substrate 27 without damaging the precoated surface 28.

Figure 7:
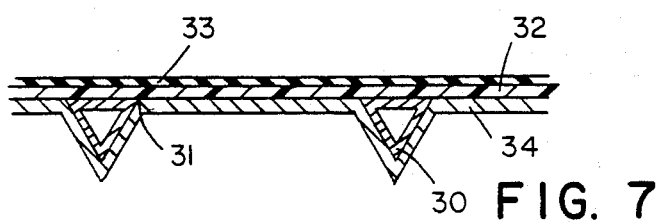
FIG. 7 is a partial expanded cross-sectional view of an absorber plate formed by spraying molten metal onto a sheet or foil substrate using triangular shaped heat transfer tubes.

FIG. 7 shows an expanded cross-sectional view of an 20 absorber plate similar to that described in FIG. 6. If it is not desirable to form grooves in the substrate to receive the absorber tubes, alternatively one can modify the shape of the tube 30 so that, when attached to a flat substrate plate 32 and sprayed with molten metal 34 according to the process described wherein, the sprayed metal layer 34 makes a smooth transition from substrate 32 to absorber tube 30 at joint 31. FIG. 7 shows a modified absorber tube 30 in a triangular shape, however, the present invention is not limited to any particular size or shape. Also shown is surface 33 which may be a selective or non-selective surface coating, said coating may be on either side of the absorber plate which is comprised of elements 30, 32, and 34 restricted only in that it be on that side of the absorber facing the sun.

Figure 8:
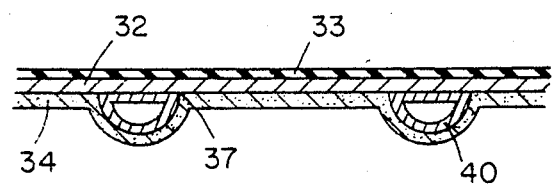
FIG. 8 is a partial expanded cross-sectional view of an absorber plate formed by spraying molten metal onto a foil or sheet substrate using half-round shaped heat transfer tubes.

FIG. 8 is an expanded cross-sectional view of one variation of an absorber plate formed according to the process of spraying molten metal disclosed herein. As in FIG. 7, FIG. 8 shows a flat substrate 32 with no grooves to receive absorber tubes 40, hence tubes 40 have had their shape modified to facilitate the spraying of molten metal coating 34 to ensure that joints 37 are properly filled, securing said tubes 40 to said substrate 32. Coating 33 shows a selective or non-selective surface coating applied to the absorber plate, comprised of elements 32, 34 and 40 restricted only in that it be on the side of the absorber facing the sun. FIG. 8 shows absorber tubes 40 in a half-round shape, said tubes not limited to any shape or size.

Figure 9:
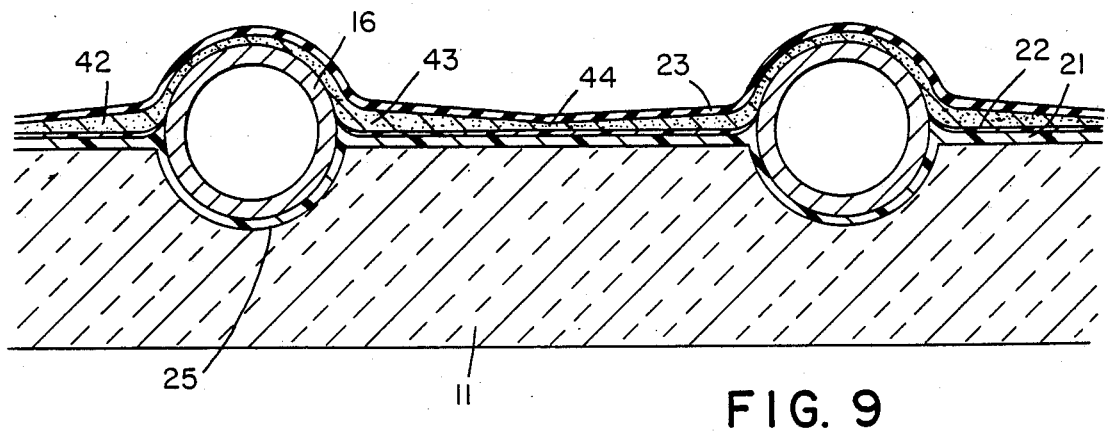
FIG. 9 is a partial expanded cross-sectional view of an absorber plate formed by spraying molten metal wherein the thickness of the absorber plate is varied.

FIG. 9 is an expanded cross-sectional view of a absorber 20 plate manufactured according to the process described herein of spraying molten metal. Molten metal is sprayed onto insulating substrate 11 with grooves 25 receiving tubes 16 to form absorber plate 42. Underlying base coats 21 and 22 may be used, as described in FIG. 5, to improve the adhesion of 42 to 11.

FIG. 9 is a variation of FIG. 5, in that the absorber plate 42 thickness is varied in order to increase the rate of heat flow from the absorber plate to the absorber tube. The molten metal spray can be controlled as it is deposited so as to precisely control the thickness of the absorber plate in predetermined areas for more efficient use of the metal and better thermal efficiency. The preferred embodiment shows absorber 42 thicker in the vicinity of the absorber tubes 16 and 5 tapering off to the midpoint between the tubes 44, where the thickness increases until it meets the adjacent absorber tube. The present invention is not limited to any particular size, shape, thickness or pattern of varied thickness of absorber plate 42. Also shown is optional selective surface 23, as described in FIG. 5, which may be formed by spraying molten metal.

Figure 10:
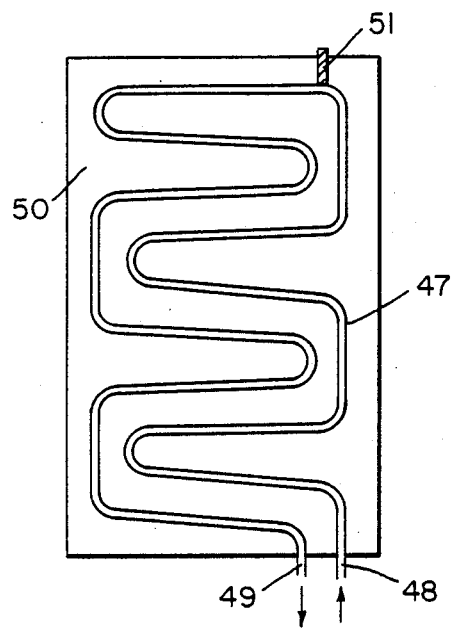
FIG. 10 shows a collector having a sinusoidal heat transfer tube embedded in an absorber plate with hot and cold tubes arranged in a heat exchange relationship.

FIG. 10 shows an absorber plate 50 with the heat transfer tubing 47 embedded in or attached thereto, in a sinusoidal pattern. Inlet port 48 and exit port 49 are located next to each other with remaining, following tube sections run parallel or near parallel so that the hot and cold tubes are in a heat exchange relationship with each other, via the absorber plate 50. This has the effect of moderating hot spots on the absorber by keeping any one particular area from getting considerably hotter than the rest of the absorber, which would decrease efficiency because of increased conduction, convection and radiation from the hot spot. Additionally, the tubes may be arranged with a gentle slope so that the entire tubing configuration may drain by gravity. A vacuum breaker may be installed, if necessary for breaking a vacuum in the tube 47. Because the absorber plate 50 is formed from sprayed liquid metal, it can easily conform to almost any absorber tube arrangement.

Figure 11:
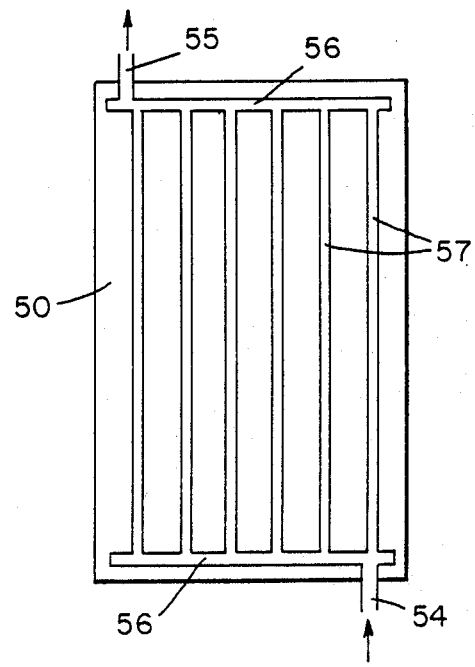
FIG. 11 shows a collector having heat transfer tubing embedded in an absorber plate in a manifold-type arrangement.

FIG. 11 shows absorbing tubing 57 in a more conventional arrangement, said tubes 57 running parallel to each other, connected at the ends by a pair of manifolds 56. This absorber tubing arrangement may be embedded, coated or attached to absorber plate 50 by spraying molten metal as previously described. Inlet port 54 and exit port 55 are provided to introduce and remove the heat transfer fluid. The tubing may be arranged so as to drain by gravity, if desired.

Figure 12:
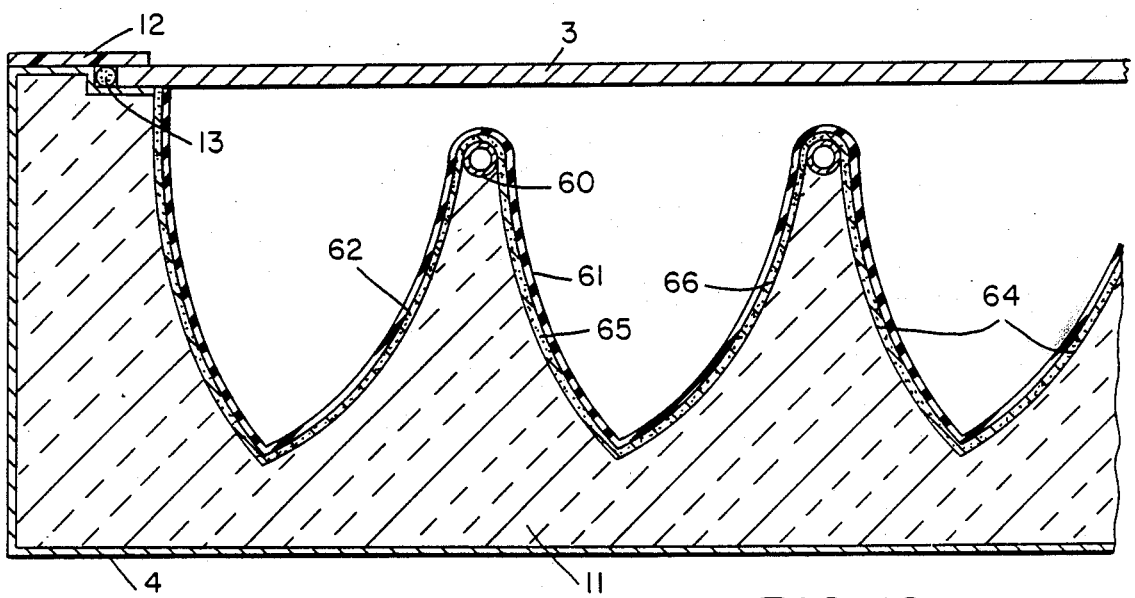
FIG. 12 is a partial cross-sectional view of a solar collector showing a modified trough-shaped absorber plate.

FIG. 12 is an expanded cross-sectional view of a portion 10 of a collector illustrating a variation in the geometry of the absorber plate. Insulating material or substrate 11 has troughs 64 with an absorber plate 62 comprising sprayed molten metal so that, when cool, the sprayed metal coating 62 conforms to the trough shape. The net result is that when the collector is mounted at an angle to receive solar radiation, with said troughs running parallel to the ground, heat escaping by convection on a lower surface 65 will rise to come into contact with the surface adjacent to it or above it, 66, transferring any net accumulated heat to the absorber 66 and/or absorber tube 60. Otherwise, heated air or gas rising off the absorber plate, in a conventional design, would transfer its heat to the transparent glazing 3 where it would then be lost to the environment. Additionally, the majority of radiation escaping absorber 62 will be reabsorbed by the adjacent wall. The trough shape is designed to minimize radiation losses. For this reason, 61 may be a non-selective surface. The extra cost of material for the increased surface area caused by the troughs is balanced out by eliminating the cost of a highly efficient selective surface. The preferred embodiment uses, but is not limited to, an inexpensive semi-selective coating. Hence, the net result is that, while radiation losses remain about the same as a flat absorber with a selective surface, losses from convection are significantly lowered. Convection losses account for the majority of heat losses in a solar collector. Collector frame 4, gasket or sealer 13, and clamp 12 are also shown. An alternative design also covered by the present invention would be an absorber plate manufactured according to the specifications of FIG. 6 and formed into said trough shape.

Figure 13:
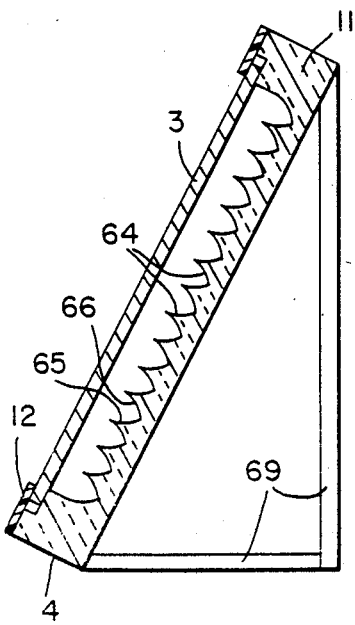
FIG. 13 is a cross-sectional view of a solar collector that uses a modified trough shape for an absorber plate.

FIG. 13 shows a cross-sectional view of a solar collector panel having troughs 64 with the absorber plate sprayed on with sprayed molten metal according to the specifications for FIG. 12. Frame 69 holds the collector at an angle to the ground, so that heated air or gas rising from a lower side 65 of the absorber plate will rise to transfer its heat to the upper, adjacent side 66. Insulation 11, collector frame 4, clamp 12, and transparent glazing 3 are also shown.

Figure 14:
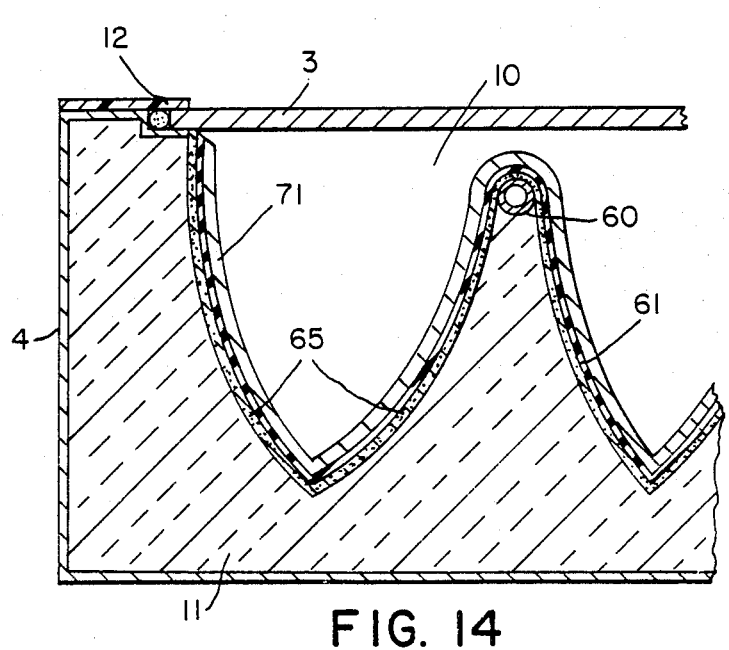
FIG. 14 is a cross-sectional view of a portion of a solar collector showing a modified trough-shaped absorber plate, utilizing a transparent coating on said absorber plate.

FIG. 14 is an expanded cross-sectional view of a solar 20 collector panel according to the specifications disclosed in FIGS. 12 and 13, where the absorber 65 is modified to a trough shape. Coating 61 may be any coating with the ability to efficiently absorb solar radiation. Reference numeral 71 shows a transparent coating covering 61 in such a manner that solar radiation striking the collector passes through transparent glazing 3, insulating gas or air space 10, and coating 71 where it is absorbed by 61. The net surplus of heat is transferred to absorber plate 65 and absorber tube 60 where it is carried away by a heat transfer fluid Coating 71 serves to slow the rate at which coating 61 and absorber 65 can heat the adjacent air or gas, thus slowing heat loss from conduction and convection. Although coating 71 does not have a selective surface and radiation emitted from the surface would normally be excessive, most radiation leaving the surface of 71 will be reabsorbed by an adjacent wall with a similar absorber and coating 61, 65 and 71. Insulation 11, collector frame 4, and clamp 12 are also shown.

Figure 15:
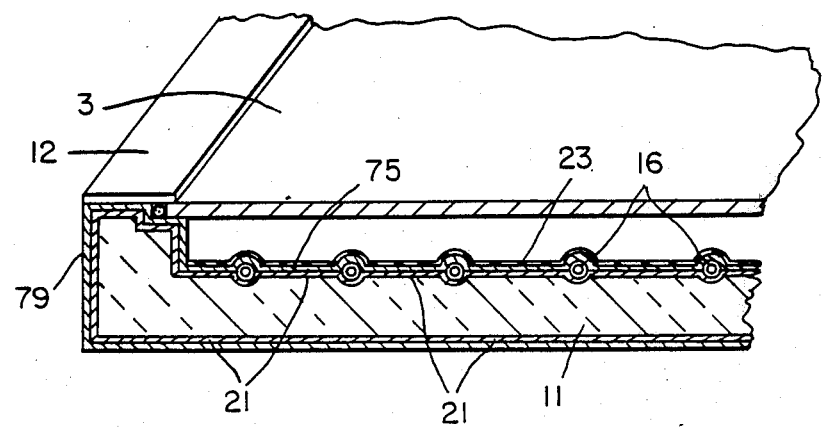
FIG. 15 is a cross-sectional view of a portion of a solar collector where the collector, absorber plate, selective surface, exterior frame and backing are all made by spraying molten metal, resulting in one continuous metal coating.

FIG. 15 is part of a cross-sectional view of a solar collector. This is an example of a unibody-type collector where the absorber plate 75, the optional selective surface 23 and the exterior frame or skin 79 are all formed by the same process of spraying molten metal, as disclosed herein. The entire collector is coated with sprayed molten metal, the preferred embodiment using, but not limited to, one metal forming the base for the absorber plate 75 covering the inside of the collector attached to insulation material 11 and a skin attached to insulation material 11 covering the outside of the collector. Optional absorber tubes 16 may be embedded in absorber 75. The absorber plate 75 is then built up to the desired thickness according to methods disclosed previously herein. The preferred embodiment uses aluminum for the absorber plate and the outer skin 79. A variation of the preferred embodiment uses sprayed copper for the absorber plate 75 and another sprayed metal, such as aluminum, as the exterior skin 79, with the two metals joined together wherever the coatings overlap. The present invention is not limited by any particular thickness for the absorber plate 75 or the skin 79. The skin 79 and absorber plate 75 may be allowed to heat up during the spraying of molten metal process, and then cool down causing the skin to shrink caused by contraction of the cooling metal, putting the entire insulating substrate into compression, dramatically increasing its strength, much the same way that glass is strengthened by tempering. An optional selective surface 77 may be formed by spraying molten metal according to the method disclosed previously herein. This entire process forming the absorber plate 75, outer skin 79, and optional selective surface 77 may all be formed at approximately the same time, in the same operation, using the same type of equipment. Additionally, a base coat or coats 21 may be initially applied to improve adhesion of the sprayed molten metal to the substrate. Clamp 12 and transparent glazing 3 are also shown.

Figure 16:
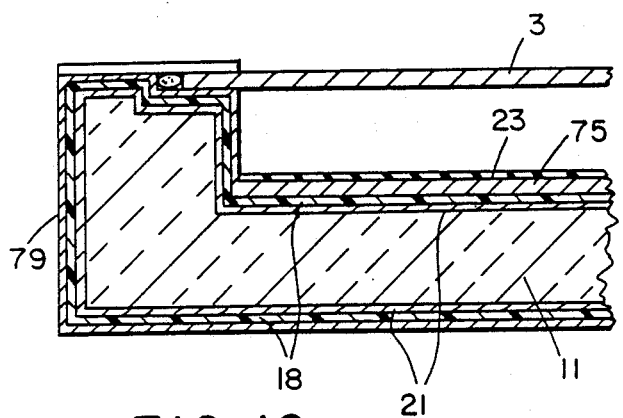
FIG. 16 is an expanded cross-sectional view of FIG. 15, using an additional layer or layers of sprayed molten metal.

FIG. 16 is an expanded cross-sectional view of a portion of a collector of the unibody-type as disclosed in the description of FIG. 15. At times, it may be desirable to use more than one sprayed metal to form the absorber 75 and/or skin 79. Reference numeral 81 shows an additional layer of another metal applied to substrate 11. A variety of reasons for using additional layers of different metals exists. The preferred embodiment uses an additional layer of sprayed metal 81 from the group of brass, steel or copper as the insulation material 11 is not compatible with the metal of absorber 75 and skin 79. An example of such a condition would be when a foamed concrete insulation material 11 is used as a substrate for the sprayed aluminum coatings for the absorber 75 and skin 79. The high alkalinity of the foamed concrete might cause corrosion to occur in the aluminum. Additionally, base coat 21, as described previously, can be used to enhance adhesion of the sprayed metal coating and serve as a barrier separating the insulation material 511 and sprayed metal coatings 75 and 79. Another example of a condition where it would be desirable to use more than one layer of sprayed molten metal to be applied to the substrate is when the desired metal to be sprayed will not adhere well to the substrate. In such a case, it is often advantageous to use an underlying base coat 81 of a different metal that will have better adhesion to the substrate 11. The metal zinc is often used, but is not limited to, as the underlying base metal. The present invention is not limited to an particular number of layers or particular thickness of the sprayed molten metal.

Figure 17:
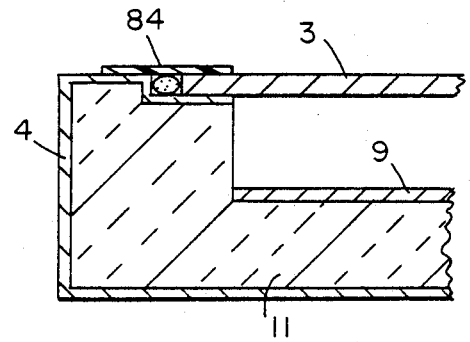
FIG. 17 is a cross-sectional view of a portion of a solar collector where the exterior transparent glazing is sealed to the collector frame by spraying molten metal.

FIG. 17 is an expanded cross-sectional view of a solar collector where the transparent glazing 3 is sealed and/or attached to the collector frame by spraying the perimeter of the glazing and the adjacent perimeter of the collector frame with an appropriate molten metal, and then spraying additional molten metal 84 to bridge the gap between 3 and 4. Both surfaces of 3 and 4 should be prepared according to methods previously disclosed to ensure proper adhesion of the sprayed molten metal. If glass is used as transparent glazing 3, it is important to grit blast the perimeter where the molten metal coating is to be applied. Absorber plate 9 and insulation material 11 are also shown.

Figure 18:
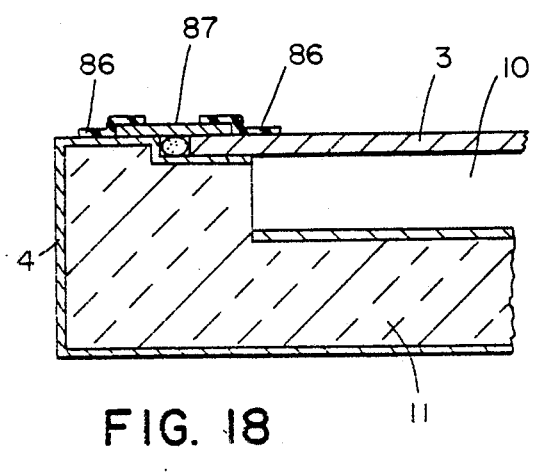
FIG. 18 is a cross-sectional view of a portion of a solar collector where the exterior transparent glazing is sealed to the collector frame by spraying molten metal, is utilizing a flexible intermediate substrate or bridge to take up differential expansion.

FIG. 18 is an expanded cross-sectional view of a portion of a solar collector showing transparent glazing 3 attached to frame 4 by flexible bridge 87, said flexible bridge attached to glazing 3 and frame 4 by spraying the appropriate molten metal 86 according to the specifications previously disclosed in FIG. 17. The preferred embodiment uses, but is not limited to, a flexible, textured foil for flexible bridge 87. The entire joint has to be flexible enough to take up differences in thermal expansion between the glazing 3 and frame 4, and also any movement caused by pressure exerted on the glazing due to changes in the temperature of the gas 10 within the collector.

Figure 19:
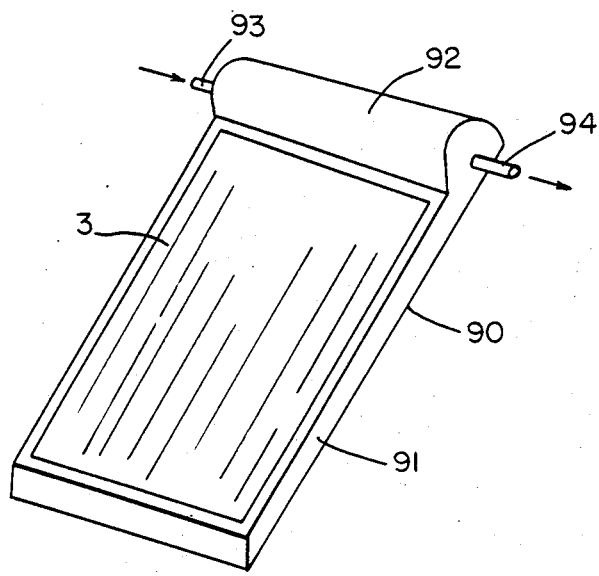
FIG. 19 is an isometric view of a solar collector formed by spraying molten metal, with a storage tank in a thermosyphon relationship with the collector.

FIG. 19 shows an isometric view of a solar collector 90, glazing 3 and frame 91 manufactured by spraying molten metal as described herein. The heat transfer fluid in collector 90 is kept in a thermosyphon relationship with storage tank 92, said storage tank 92 being attached to collector 90, or an integral part of it. Cold fluid enters inlet port 93 and heated fluid exits the storage tank at 94.

Figure 20:
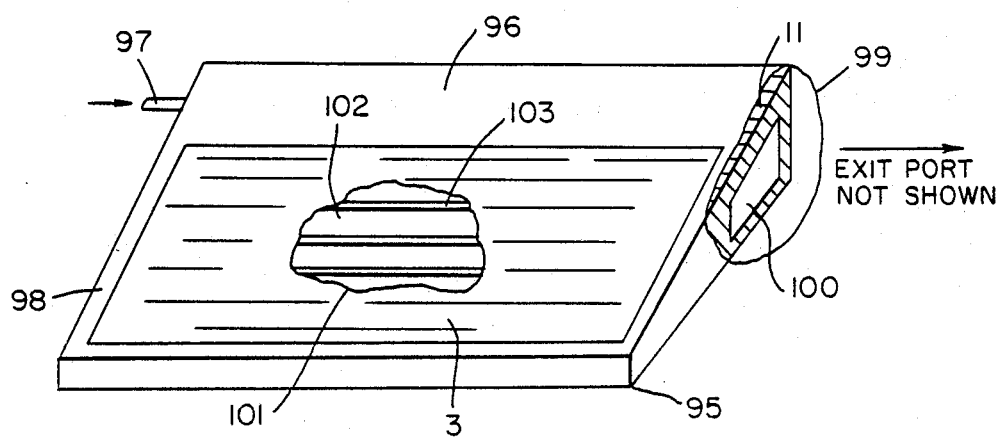
FIG. 20 is an isometric view of a solar collector with the storage tank molded into the same frame, all formed by spraying molten metal, said storage tank exposed by cutaway.

FIG. 20 shows an isometric view of a thermosyphon type collector 95 manufactured according to the methods of manufacturing collectors using sprayed molten metal and foamed or cellular insulation materials disclosed herein. This unit has the solar collector and storage tank all incorporated within the same housing 96 and frame 98. The absorber plate 102, manufactured according to methods of spraying molten metal described herein, is exposed by cutaway 101 in transparent glazing 3 showing absorber tubes 103 embedded within or attached to absorber plate 102 by spraying molten metal as disclosed previously. Cutaway 99 exposes the storage tank 100 which is housed within insulating material 11, said storage tank being either an independent storage tank such as stainless steel, or being formed from the insulating material 11. In the later case, a void cast within the insulating material 11 in section 96 is coated on the inside with materials to create a watertight tank. Examples of materials or combinations of materials that could be used to form the inside wall of the tank are a sodium silicate base or derivative, plastic resins such as vinylesther and sprayed molten metal coatings such as stainless steel formed according to the methods disclosed herein. The thermosyphon collector may be formed from the unibody style of collector described herein, where sprayed molten metal over a foamed insulating substrate 11 is used to form the absorber plate 102 the outer skin or frame 96 and 98, and optionally the selective surface. As discussed above, an additional option would be to make the storage tank from sprayed molten metal. Additionally fluid inlet port 97 is shown. The fluid outlet port is not shown because of the cutaway. The preferred embodiment uses copper for the absorber tubes 103, aluminum over foamed concrete insulating material 11, for absorber plate 102 and outer skin 96 and 98 with a sodium silicate base or derivative as an underlying coating to enhance adhesion of the sprayed metal coating and to provide corrosion resistance for the sprayed aluminum coatings. Additionally, the storage tank 100 may be a preformed or sprayed molten metal, steel or stainless steel tank. If steel is used, means such as, but not limited to, vitreous enamel must be used to protect the tank from corrosion.

Figure 21:
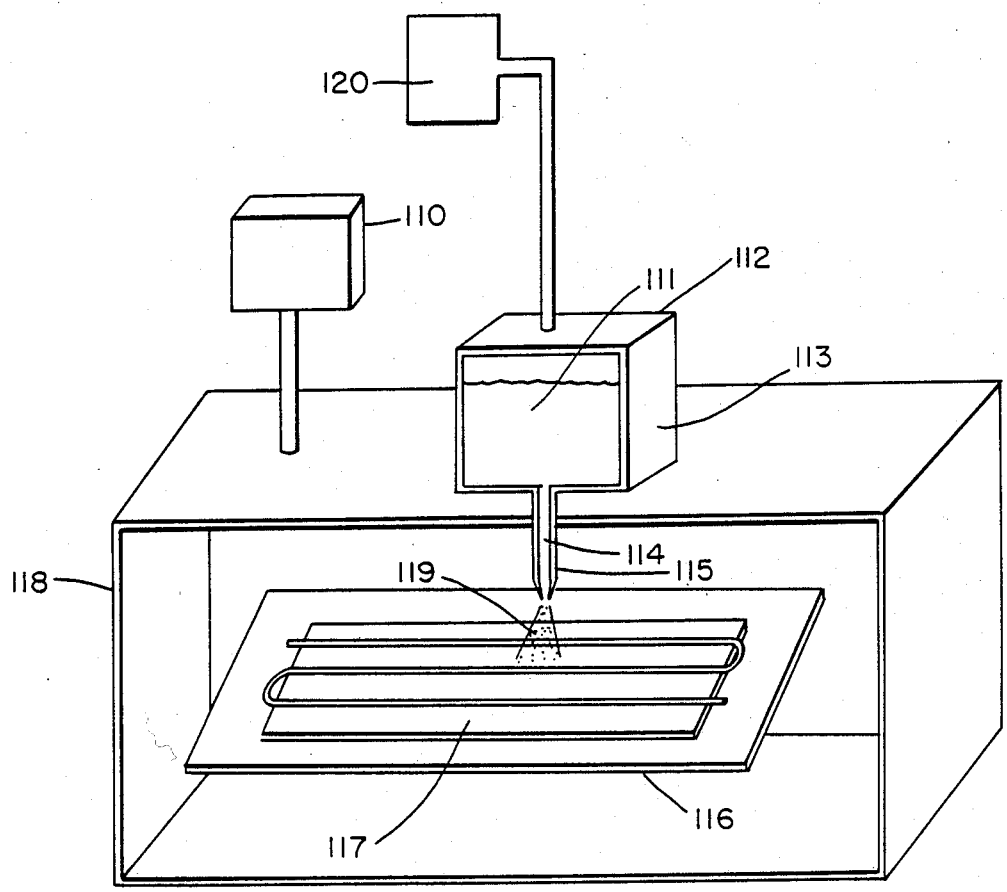
FIG. 21 depicts a preferred apparatus for carrying out the spraying aspects of the present invention.

FIG. 21 shows a typical apparatus comprising conventional components for carrying out the spraying aspect of the invention. The spraying method is performed by using a chamber 118 in communication with a vacuum or inert gas source 110 in which there is disposed a substrate 117 having a sinusoidally patterned heat exchange tube. The substrate 117 rests on a work platform 116 in the chamber 118. During operation, sprayed metal 119 is ejected from the end of a nozzle tube 115 which is supplied with molten metal 111 from reservoir 113 via a channel 114 in the nozzle 115. The reservoir 113 preferably is pressurized by a pressure source 120 having a pressure greater than that of the chamber 118.

It should be noted that only the preferred embodiments of this invention have been disclosed and that the scope of this invention is not limited to any one particular shape, size, configuration, or material. Changes or modifications of this nature may be made without departing from the spirit of the invention. For example, while in many embodiments, tubes are shown for conveying solar energy via the working medium, hollow chambers formed in the sprayed metallic absorber plate for carrying the working medium, could also be employed.

Accordingly, while I have shown and described plural embodiments in accordance with the present invention, it is understood that the same is not limited thereto, but is susceptible to numerous changes and modifications as known to one having ordinary skill in the art, and I, therefore, do not wish to be limited to the details shown and described herein, but intend to cover all such modifications as are encompassed by the scope of the appended claims.

I claim:

1. A method of making a solar energy collector adapted to transfer heat to a working medium, said collector comprising a substrate means and tubular heat exchange means for transferring solar energy to said working medium, said method comprising the steps of:
   providing a base surface,
   arranging said tubular heat exchange means on said base surface in a structural supporting pattern,
   spraying molten metal on said base surface to form said substrate means and to join said tubular heat exchange means to said substrate means thus formed, and
   providing a supporting means for the sprayed metal of said substrate means.

2. A method of making a solar collector adapted to transfer heat to a working medium, said collector comprising: substrate means for providing a base surface for forming an absorber plate of said solar collector and circulation means for conveying solar energy to said working medium, said method comprising the steps of:
   forming said absorber plate on said substrate means and integrally joining said circulation means therewith by spraying molten metal on said substrate means,
   said spraying step including building up sprayed molten metal of a sufficient thickness to achieve a unitary structure,
   providing a supporting means for the sprayed metal of said absorber plate, and
   embedding said circulation means by a method including said spraying step thereby to protect said circulation means from an external environment.

3. The method as recited in claim 1 further comprising the step of: preheating said substrate prior to spraying said molten metal whereby to improve the adhesion of said sprayed molten metal.

4. The method as recited in claim 1 further comprising the step of roughening the surface of said substrate prior to spraying said molten metal thereon whereby to improve adhesion of said molten metal particles.

5. The method as recited in claim 1 further comprising the steps of applying a plurality of layers of said sprayed molten metal wherein subsequent sprayed molten metal layers are applied on a preceding layer prior to solidification thereof.

6. A method as recited in claim 1 further comprising the step of spraying said molten metal by use of a stream of pressurized gas, said gas being inert to reduce oxidation of said sprayed molten metal.

7. A method as recited in claim 1 wherein said substrate includes grooves for receiving said heat exchange means and said heat exchange means comprises tubes, said method further comprises the step of forming grooves in said substrate means, depositing an adhesive enhancing primer on said substrate means, placing said heat exchange means in said grooves so as to set in said primer to form a fillet between said substrate and said heat exchange means, and spraying said molten metal onto the surfaces of said heat exchange means and said substrate means in a fashion to fill the intersticies between said heat exchange means and grooves.

8. A method as recited in claim 7 wherein said adhesive enhancing primer comprises sodium silicate and aluminum oxide.

9. A method as recited in claim 1 further comprising the steps of:
depositing on said substrate a primer substance having high quality adhesive properties with respect to said substrate, and subsequently spraying said molten metal onto said primer substance whereby to improve adhesion of said sprayed molten metal onto said substrate.

10. A method as recited in claim 1 wherein said spraying step is carried out in sequence operations including the steps of:
spraying said molten metal onto said substrate means in thin layers, and allowing the respective layers to cool uniformly between successive spraying steps to prevent unequal expansion and/or contraction whereby to reduce cracking, warping and deformation of the successively sprayed layers forming the absorber plate means and said substrate.

11. A method as recited in claim 1 wherein said spraying completely embeds said heat exchange means whereby to reduce the likelihood of galvanic corrosion.

12. A method as recited in claim 1 wherein the spraying step comprises spraying at least two layers of different metallic substances.

13. A method as recited in claim 1 further comprising the steps of depositing a material suitable for forming a selective surface on said heat exchange means by spraying a metallic substance thereon and subsequently treating said material for forming said selective surface.

14. A method of making a solar energy collector as recited in claim 1 further including the steps of:
providing a reservoir of molten metal, pressurizing the molten metal reservoir at a first pressure level, providing an evacuated chamber for housing the substrate to be sprayed, and providing spray means between said reservoir and said chamber whereby the lower pressure of the evacuated chamber enables said molten metal to be deposited on said substrate by a pressure differential between the chamber and the reservoir.

15. A method of making a solar energy collector as recited in claim 1 further comprising the steps of:
providing a molten metal reservoir at atmospheric pressure, providing a chamber for housing said substrate wherein the chamber has a lower pressure than said reservoir, and providing spray means between said reservoir and said chamber whereby molten metal is forced into said vacuum chamber to be deposited on said substrate.

16. A method of making a solar collector panel comprising a housing, a metallic tubular conduit for carrying a working fluid, and sprayed metal absorber plate for absorbing radiant energy, said method including the steps of:
A. providing a base surface,
B. placing a metallic foil means over said base surface,
C. prearranging the tubular conduit in a pattern and placing said tubular conduit on said metallic foil means,
D. forming said absorber plate integrally with said prearranged tubular conduit and said metallic foil means by spraying molten metal over said tubular conduit and foil means,
E. embedding said patterned tubular conduit by a method including said spraying step so as to shield said tubular conduit from an external environment thereby to prevent corrosion, including galvanic corrosion resulting from any difference between the metals of said tubular conduit and said absorber plate, and
F. mounting said foil means, tubular conduit and sprayed absorber plate in a housing thereby to form said solar collector panel.

17. A method for making a solar collector panel as recited in claim 16 further comprising the step of applying a selective surface to said foil means.

18. A method of making a solar collector panel as recited in claim 16 further including the step of blackening the surface of said foil means to improve radiant energy absorption.

19. A method of making a solar collector panel comprising a housing, a metallic tubular conduit for carrying a working fluid, and a sprayed metal absorber plate for receiving radiant energy, said method including the steps of:
A. providing a base surface,
B. prearranging the tubular conduit in a pattern and placing said prearranged tubular conduit on said base surface,
C. forming said absorber plate integrally with said prearranged tubular conduit and said base surface by spraying molten metal over said tubular conduit,
D. embedding said prearranged tubular conduit by a method including said spraying step so as to shield said tubular conduit from an external environment to prevent corrosion, including galvanic corrosion resulting from any difference between the metals of said tubular conduit and said absorber plate,
E. providing a supporting means for the sprayed metal of said absorber plate, and
G. mounting said tubular conduit and sprayed absorber plate in a housing thereby to form said solar collector panel.

20. A method of making a solar collector panel as recited in claim 19 further including the step of blackening the surface of said sprayed metal absorber plate to improve radiant energy absorption.

* * * * *